US011006380B2

(12) United States Patent
Zhang et al.

(10) Patent No.: US 11,006,380 B2
(45) Date of Patent: May 11, 2021

(54) ELECTRONIC DEVICE FOR WIRELESS COMMUNICATIONS, AND WIRELESS COMMUNICATION METHOD

(71) Applicant: Sony Corporation, Tokyo (JP)

(72) Inventors: Zaichen Zhang, Nanjing (CN); Rong Zeng, Nanjing (CN); Yuxin Wei, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/902,284

(22) Filed: Jun. 16, 2020

(65) Prior Publication Data

US 2020/0314786 A1 Oct. 1, 2020

Related U.S. Application Data

(63) Continuation of application No. 16/378,588, filed on Apr. 9, 2019, now Pat. No. 10,736,068, which is a
(Continued)

(51) Int. Cl.
*H04W 56/00* (2009.01)
*H04L 27/00* (2006.01)
(Continued)

(52) U.S. Cl.
CPC ....... *H04W 56/0035* (2013.01); *G01S 13/505* (2013.01); *H04B 17/336* (2015.01);
(Continued)

(58) Field of Classification Search
CPC ..... H04L 5/0048; H04L 5/0007; H04L 5/001; H04L 27/2657; H04L 5/0023;
(Continued)

(56) References Cited

U.S. PATENT DOCUMENTS 5,109,362 A 4/1992 Berni
5,943,606 A 8/1999 Kremm et al.
(Continued)

FOREIGN PATENT DOCUMENTS

CN 1239612 A 12/1999
CN 102739298 A 10/2012
CN 103217670 A 7/2013

OTHER PUBLICATIONS

International Search Report dated Nov. 29, 2016 in PCT/CN2016/099686 filed Sep. 22, 2016.

*Primary Examiner* — Kwasi Karikari
(74) *Attorney, Agent, or Firm* — Xsensus, LLP

(57) ABSTRACT

This disclosure relates to an electronic device for wireless communications, and a wireless communication method. The electronic device comprises one or more processors, wherein each processor is configured to respectively conduct space-domain filtering on received signals of a plurality of antennas, respectively; estimate the frequency shift of corresponding received signals based on the signals, on which space-domain filtering is conducted, of various antennas; estimate, according to the estimated frequency shift and a parameter of the space-domain filtering, a Doppler frequency shift generated by the relative motion between transceiving ends of the received signals and a carrier frequency offset generated by frequency inconsistency of the transceiving ends; and conduct frequency preprocessing on sent signals of the antennas according to the estimated Doppler frequency shift, and/or control to feed back information related to the estimated Doppler frequency shift to a signal sending end.

20 Claims, 11 Drawing Sheets

Related U.S. Application Data continuation of application No. 15/760,802, filed as application No. PCT/CN2016/099686 on Sep. 22, 2016, now Pat. No. 10,299,237.

(51) Int. Cl.
  *H04B 17/336* (2015.01)
  *G01S 13/50* (2006.01)
  *H04L 27/10* (2006.01)
  *H04W 64/00* (2009.01)

(52) U.S. Cl.
  CPC .............. *H04L 27/00* (2013.01); *H04L 27/10* (2013.01); *H04W 64/006* (2013.01)

(58) Field of Classification Search
  CPC ............ H04L 25/0204; H04L 25/0202; H04L 25/0222; H04L 2027/0026; H04L 2027/0065; H04L 2027/0067; H04W 72/042; H04W 56/0035; H04W 72/0413; H04W 72/046; H04W 4/027; H04W 36/32; H04W 56/00; H04W 56/0005; H04W 84/06

See application file for complete search history.

(56) References Cited

U.S. PATENT DOCUMENTS

| | | |
|---|---|---|
| 2009/0279476 A1 | 11/2009 | Li et al. |
| 2011/0142025 A1 | 6/2011 | Agee et al. |
| 2014/0086083 A1* | 3/2014 | You ................... H04W 56/0015 370/252 |
| 2018/0003827 A1* | 1/2018 | Farrokhi ................. G01S 19/07 |

* cited by examiner

ELECTRONIC DEVICE FOR WIRELESS COMMUNICATIONS, AND WIRELESS COMMUNICATION METHOD

CROSS-REFERENCE TO RELATED APPLICATIONS

The present application is a continuation of U.S. application Ser. No. 16/378,588, filed Apr. 9, 2019, which is a continuation of U.S. application Ser. No. 15/760,802, filed Mar. 16, 2018 (now U.S. Pat. No. 10,299,237), which is based on PCT filing PCT/CN2016/099686, filed Sep. 22, 2016, which claims priority to CN 201510617374.2, filed Sep. 24, 2015, the entire contents of each are incorporated herein by reference.

FIELD

Embodiments of the present disclosure relate to wireless communication, and in particular to an electronic device for wireless communication and a wireless communication method.

BACKGROUND

In a fast time-varying channel environment (such as a high speed railway), the performance of a wireless communication system may be affected by a Doppler effect caused by a relative movement between a receiving end and a transmitting end. In addition, in a wireless cellular mobile communication system, to restrain a carrier frequency offset generated by frequency inconsistency between receiving and the transmitting ends, a frequency of a local oscillator of a receiver is generally adjusted by measuring a frequency offset of a received signal by using an automatic frequency calibration technology, thereby the frequency generated by the local oscillator is synchronized with the carrier frequency of the received signal. In a fast time-varying channel environment, an effect on the received signal caused by the carrier frequency offset generated by the frequency inconsistency of the receiving and transmitting ends has a manner similar to that of an effect on the received signal caused by the Doppler shift generated by the relative movement between the receiving and transmitting ends. Therefore, the frequency offset parameters estimated at the receiving end by the automatic frequency calibration technology essentially include both the carrier frequency offset generated by the frequency inconsistency of the receiving and transmitting ends and the Doppler shift generated by the relative movement between the receiving and transmitting ends.

SUMMARY

Generally, in order to reduce a Doppler effect at a receiving end of a signal, frequency preprocessing is performed on a transmission signal at a transmitting end of the signal with a Doppler parameter estimated from a received signal. In performing frequency preprocessing on the transmission signal at the transmitting end, the parameter to be used is a Doppler shift instead of a carrier frequency offset generated by frequency inconsistency of the receiving and transmitting ends. In general, a difference between a frequency of an oscillator at the receiving end and a frequency of an oscillator at the transmitting end is unavoidable. Thus, in performing frequency preprocessing on a transmission signal with a related technology, a frequency offset generated by the frequency inconsistency of the receiving and transmitting ends and a Doppler shift generated by a relative movement between the receiving and transmitting ends cannot be distinguished from each other, so an effect on the performance of a receiver caused by the Doppler shift generated by the relative movement between the receiving and transmitting ends cannot be restrained.

In another aspect, a wireless network coverage is achieved by way of transmitting a signal by a base station in a wireless cellular system. The Doppler effect is related to both a relative moving speed between the receiving and transmitting ends and an arrival angle of the received signal. So a Doppler frequency changes greatly when a mobile station moves close to a base station and performs a handover between two base stations. This is one of main reasons for occurrence of the call drops and handover failures in a fast time-varying channel environment in the related technologies.

In the following, an overview of embodiments of the present disclosure is given to provide basic understanding to some aspects of the present disclosure. It should be understood that this overview is not an exhaustive overview of the present disclosure. It is neither intended to determine a critical or important part of the present disclosure, nor to limit the scope of the present disclosure. An object of the overview is only to give some concepts in a simplified manner, which serves as a preface of a more detailed description later.

According to an aspect of the present disclosure, an electronic device for wireless communication includes at least one processor. The processor is configured to: perform spatial filtering respectively on received signals of multiple antennas; estimate, based on the spatially-filtered signal of each of the antennas, a frequency offset of a corresponding received signal; estimate, based on parameters of the spatial filtering and the estimated frequency offset, a Doppler shift caused by a relative movement between a receiving end and a transmitting end of the received signal and a carrier frequency offset caused by frequency inconsistency of the receiving end and the transmitting end; and perform frequency preprocessing on a transmission signal of the antenna based on the estimated Doppler shift, and/or perform control to feed back information on the estimated Doppler shift to the transmitting end of the received signal.

According to another aspect of the present disclosure, a wireless communication method includes: performing spatial filtering respectively on received signals of multiple antennas; estimating, based on the spatially-filtered signal of each of the antennas, a frequency offset of a corresponding received signal; estimating, based on parameters of the spatial filtering and the estimated frequency offset, a Doppler shift caused by a relative movement between a receiving end and a transmitting end of the received signal and a carrier frequency offset caused by frequency inconsistency of the receiving end and the transmitting end; and performing frequency preprocessing on a transmission signal of the antenna based on the estimated Doppler shift, and/or performing control to feed back information on the estimated Doppler shift to the transmitting end of the received signal.

The solutions according to the embodiments of the present disclosure are beneficial to improve the throughput performance of a wireless communication system in a fast time-varying channel environment.

BRIEF DESCRIPTION OF THE DRAWINGS

The present disclosure may be better understood with reference to the description made in conjunction with the drawings hereinafter. Same or similar components are identified by same or similar reference characters throughout the drawings. The drawings together with the detailed description below are incorporated in and form a part of the specification, for further illustrating preferred embodiments of the present disclosure with examples and explaining the principle and advantages of the present disclosure. In the drawings.

DETAILED DESCRIPTION OF EMBODIMENTS

Figure 1:
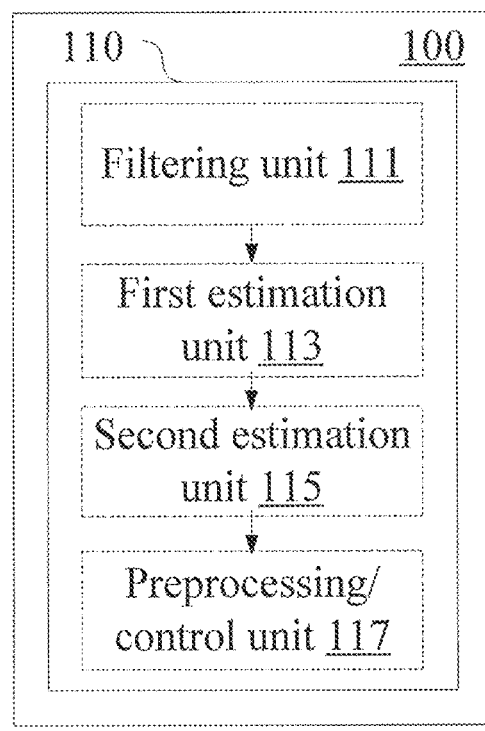
FIG. 1 is a block diagram showing a configuration example of an electronic device for wireless communication according to an embodiment of the present disclosure.

Hereinafter, embodiments of the present disclosure are described in conjunction with the drawings. Elements and features described in a drawing or an embodiment of the present disclosure can be combined with elements and features shown in one or more of other drawings or embodiments. It should be noted that, for clarity, it is omitted representations and descriptions of components and processing which are irrelevant to the present disclosure and known by those skilled in the art in the drawings and the specification.

As shown in FIG. 1, an electronic device 100 for wireless communication according to an embodiment includes at least one processor 110. The processor 110 includes a filtering unit 111, a first estimation unit 113, a second estimation unit 115 and a preprocessing/control unit 117.

It should be noted that, although the filtering unit 111, the first estimation unit 113, the second estimation unit 115 and the preprocessing/control unit 117 of the processor 110 are shown with separate dashed blocks in the figure, functions of these units may be implemented by the processor 110 as a whole, and are not necessarily implemented by actual separate components in the processor 110. In addition, although the processor 110 is shown with one block in the figure, the electronic device 100 may include multiple processors, and the functions of the filtering unit 111, the first estimation unit 113, the second estimation unit 115 and the preprocessing/control unit 117 may be distributed in multiple processors. In this case, these functions are performed by the multiple processors in a cooperative way.

The filtering unit 111 is configured to perform spatial filtering on received signals of multiple antennas.

Specifically, the spatial filtering performed on the signals received via the multiple antennas may be represented as:

$$r=Fy \qquad \text{Equation 1}$$

where y is a vector of received signal with a length of N, r is a vector of filtered signal with a length of N, F is a spatial filtering matrix with a size of N×N, and elements on a k-th row of the spatial filtering matrix correspond to a k-th spatial filter coefficient. The k-th row includes N elements. The spatial filter coefficients can be determined with a method such as minimum equivalent wavenumber spectrum extension.

It should be noted that, the object of the spatial filtering here is to provide a necessary signal dimension for a joint estimation in the subsequent processing. The joint estimation is performed for a Doppler shift generated by a relative movement between a receiving end and a transmitting end and a carrier frequency offset generated by frequency inconsistency of the receiving end and the transmitting end.

The first estimation unit 113 is configured to estimate, based on the spatially-filtered signal of the each of the antennas, a frequency offset of a corresponding received signal.

The first estimation unit 113 may estimate the frequency offset in various manners known in the art. For example, according to an embodiment, the first estimation unit 113 may estimate the frequency offset of the received signal by using an estimation method based on training sequence or a blind estimation method based on signal statistical information, but the invention is not limited thereto.

It should be noted that, the frequency offset estimated by the first estimation unit 113 may include a component of the Doppler shift generated by a relative movement between the receiving and transmitting ends of the signal and a component of the carrier frequency offset generated by frequency inconsistency of the receiving and transmitting ends. As mentioned above, the components of the above two types of frequency offset cannot be distinguished from each other according to the related technologies, and sometimes a sum of the components of the two types of frequency offset is simply approximated as a Doppler shift (for example, referred to as an equivalent Doppler shift) for subsequent processing. In the solutions of the present disclosure, the components of the above two types of frequency offset can be estimated jointly, that is, the Doppler shift and the carrier frequency offset can be respectively estimated.

The second estimation unit 115 is configured to estimate the Doppler shift generated by the relative movement between the receiving and transmitting ends of the received signal and the carrier frequency offset generated by frequency inconsistency of the receiving and transmitting ends, based on the frequency offset estimated by the first estimation unit 113 and the parameters of the spatial filtering performed by the filtering unit 111.

Next, the estimations performed by the first estimation unit 113 and second estimation unit 115 are illustrated with reference with specific examples. It should be understood that, the invention is not limited to details described in the following examples.

Assuming that there are N antennas at the receiving end, and accordingly, the filtering unit 111 performs spatial filtering respectively on received signals of the antennas with N spatial filters. The first estimation unit 113 may obtain N frequency offset estimation parameters based on signals filtered by the filtering unit 111. The parameters are represented as $f_d = [f_d^1 \ f_d^2 \ \ldots \ f_d^N]^T$, where $f_d^n$ is a frequency offset estimated from a signal filtered by the n-th spatial filter. It should be noted that, although the frequency offset of the received signal estimated by the first estimation unit 113 is represented with $f_d^n$ here, the frequency offset $f_d^n$ contains both the component of the Doppler shift and the component of the carrier frequency offset (or, $f_d^n$ here can be understood as corresponding to the aforementioned equivalent Doppler shift).

As described above, when performing the estimation, the first estimation unit 113 may use training sequences and adopt a self-correlation-based estimation algorithm or a cross-correlation-based estimation algorithm, or may adopt a blind frequency offset estimation algorithm. The estimated parameter $f_d^n$ is not only related to the carrier frequency offset $f_\Delta$ generated by frequency inconsistency of the receiving and transmitting ends and the Doppler shift $f_d$ generated by the relative movement between the receiving and transmitting ends of the signal, but also related to the n-th spatial filter parameter, and can be represented as:

$$f_d \cos(\varphi_n - \theta_R) + f_\Delta = f_d^n \quad \text{Equation 2}$$

where $\theta_R$ is a movement direction angle of the signal receiving end such as a mobile terminal, $\varphi_n$ is a direction angle determined based on the n-th spatial filter parameter, and $\varphi_n$ may be calculated with the following equation:

$$\varphi_n = \arccos\left(\frac{\lambda \overline{k_n}}{2\pi}\right) \quad \text{Equation 3}$$

where $\lambda$ is a wavelength, $\overline{k_n}$ is an average wavenumber corresponding to the n-th spatial filter, that is:

$$\overline{k_n} = E[k_n] = \frac{\int_{-\infty}^{+\infty} k S_n(k) dk}{\int_{-\infty}^{+\infty} S_n(k) dk} \quad \text{Equation 4}$$

where $S_n(k)$ is a wavenumber spectrum calculated with the following equation based on a shape of the antenna array and the n-th spatial filter parameter, from an angle spectrum $\rho_n(\theta)$ corresponding to the n-th spatial filter parameter, that is $$S_n(k) = \rho_n(\theta)\left|\frac{d\theta}{dk}\right|\frac{1}{\sqrt{k_0^2 - k^2}}\rho_n(\theta) = \frac{1}{k_0|\sin(\theta - \theta_R)|}\rho_n(\theta) \quad \text{Equation 5}$$

where $k_0 = 2\pi/\lambda$.

Since $\varphi_n$ depends on the spatial filter parameter, $\varphi_n$ is a known parameter if the spatial filter parameter is determined. Therefore, there are only two variables to be solved in Equation 2, i.e., $f_\Delta$ and $f_d$.

In other words, according to an embodiment, the second estimation unit 115 may estimate the Doppler shift $f_d$ and the carrier frequency offset $f_\Delta$ based on a relation that the frequency offset $f_d^n$ is a linear combination of the Doppler shift $f_d$ and the carrier frequency offset $f_\Delta$. The relation of the linear combination may be determined based on a signal-to-noise ratio of respectively spatially-filtered signal of the multiple antennas, the direction angle $\varphi_n$ for the respective spatial filtering and the direction angle $\theta_R$ of the relative movement between the receiving and transmitting ends of the received signal.

In addition, a binary N-dimensional signal vector $f_d$ may be constructed based on Equation 2, and binary parameters ($f_\Delta$ and $f_d$) may be estimated jointly with a weighted least square method as follows:

$$[f_\Delta f_d] = (A^T w A)^{-1} A^T w f_d \quad \text{Equation 6}$$

where A is an observation matrix, and w is an estimation weighting matrix. The weighting matrix is adopted because it is not necessarily the case that each of all the signals outputted by the N spatial filters contains a useful signal.

The observation matrix A may be represented as:

$$A = \begin{bmatrix} 1 & \cos(\varphi_1 - \theta_R) \\ 1 & \cos(\varphi_2 - \theta_R) \\ \vdots & \vdots \\ 1 & \cos(\varphi_N - \theta_R) \end{bmatrix} \quad \text{Equation 7}$$

The weighting matrix w may be represented as:

$$w = V^{-1} \quad \text{Equation 8}$$

where V is an estimation error matrix for $f_d$, which is a diagonal matrix.

In other words, according to an embodiment, the second estimation unit 115 may calculate $f_d^n$ as an estimated value of the Doppler shift $f_d$ and carrier frequency offset $f_\Delta$ by using the observation matrix and the weighting matrix. The observation matrix is related to the direction angle $\varphi_n$ and the direction angle $\theta_R$. In addition, the observation matrix may be predetermined based on the direction angles $\varphi_n$ and $\theta_R$.

In another aspect, the weighting matrix may be related to the signal-to-noise ratio of the spatially-filtered signal.

For example, an n-th element $V_n$ on the diagonal line of the estimation error matrix V in Equation 8 may be represented as:

$$V_n = \frac{1}{\pi^2 L T_s^2 * SNR_n} \quad \text{Equation 9}$$

where L is a training sequence period length, $T_s$ is a symbol period length, and $SNR_n$ is the signal-to-noise ratio of the signal filtered by the n-th spatial filter. $SNR_n$ may be calculated with the following equation:

$$SNR_n = SNR_n'\left(1 + \sqrt{1 + \frac{1}{SNR_n'}}\right) \quad \text{Equation 10}$$

where $SNR_n$ is the signal-to-noise ratio of the signal filtered by the n-th spatial filter estimated in a self-correlation way, and may be represented as:

$$SNR'_n = \frac{\left|\sum_{i=1}^{K-L} r_n^*(L+i)r_n(n)\right|^2}{\frac{1}{L-1}\sum_{j1}^{L-1}\left|\sum_{n1}^{K-L} r_n(i+j)r_n(i)\right|^2}$$ Equation 11 where $r_n(i)$ is the signal filtered by the n-th spatial filter, and K is a training sequence length. Values of the weighting matrix w need to be calculated online since the weighting matrix w needs to be calculated with the received signal r(i) which is spatially filtered.

In other words, according to an embodiment, the weighting matrix is determined based on the signal-to-noise ratio of the spatially-filtered signal estimated frame-by-frame.

In addition, in the above exemplary embodiments, the Doppler shift $f_d$ and carrier frequency offset $f_A$ may be estimated by using the weighted least square method, wherein the weighting may be performed based on the signal-to-noise ratios of the spatially-filtered signals of multiple antennas. For example, the signal-to-noise ratio may be estimated in a self-correlation manner.

By using the weighting matrix, it is beneficial to improve robustness and estimation accuracy of the parameter joint estimation algorithm in a non-ideal case.

Besides, according to an embodiment, the filtering unit 111, the first estimation unit 113 and the second estimation unit 115 may be configured to perform the above processing for the received signal frame-by-frame, to estimate the Doppler shift and the carrier frequency offset.

The electronic device according to the embodiment of the present disclosure may perform different subsequent processing by using the estimated Doppler shift and carrier frequency offset.

For example, the preprocessing/control unit 117 may be configured to perform a frequency preprocessing on a transmission signal of the antenna based on the estimated Doppler shift.

Specifically, the frequency preprocessing may include: performing the preprocessing by adopting different Doppler shift estimations for different spatial directions, and weighting the transmission signal with the signal-to-noise ratios estimated for the spatial received signals.

In the following, an example manner for performing a frequency preprocessing on a subsequent transmission signal with a Doppler shift estimated based on a received signal is described. It should be understood that, the invention is not limited to details in the example below.

In the case that $f_A$ and $f_d$ are estimated jointly, the preprocessing/control unit 117 may perform the frequency preprocessing on the transmission signal by using parameters of the spatial filters and the Doppler shift which is estimated with the received signal, that is, $$e_n(t)=V_n^{-1}\exp[-j2\pi f_d A(n,2)t]x(t)$$ Equation 12 where x(t) is a transmission information signal, $e_n(t)$ is a transmission signal in a space corresponding to the n-th spatial filter, and A(n,2) is an element in the n-th row and the second column of the observation matrix A.

In other words, when performing the frequency preprocessing on the transmission signal, the preprocessing can be made by adopting different Doppler estimation parameters for different spatial directions. In addition, the transmission signal may be weighted with the signal-to-noise ratio parameter estimated by using the spatial received signals, to adapt to a time-varying wireless channel environment.

Alternatively or additionally, the preprocessing/control unit 117 may be further configured to control to feed back information on the estimated Doppler shift to a transmitting end of the signal corresponding to the estimated Doppler shift.

The way that a receiving end of the signal estimates a Doppler parameter with the received signal and then feeds back the parameter to the transmitting end may be referred to as a closed-loop Doppler control. After receiving the parameter, the transmitting end may preprocess a signal to be transmitted with the parameter in the following signal transmitting process, to reduce the Doppler effect on the signal received at the receiving end.

Moreover, the receiving end of the signal may further select, based on the estimated Doppler shift, a filter corresponding to a signal with a highest signal-to-noise ratio among the spatially-filtered signals, feed back a Doppler parameter corresponding to the selected filter to the transmitting end to achieve the closed-loop Doppler control. The reported Doppler parameter is, for example, $f_d A(p,2)$, where p is an index of the filter corresponding to the signal with the highest signal-to-noise ratio among the spatially-filtered signals.

That is to say, the information on the estimated Doppler shift may further contain a direction angle of spatial filtering corresponding to the signal with the highest signal-to-noise ratio among the spatially-filtered signals.

A peer end communicating with the communication device according to the embodiment of the present disclosure may perform a frequency preprocessing on the transmission signal in response to the feedback information. For example, the preprocessing may be performed with different Doppler estimation parameters for different spatial directions, and the transmission signal may be further weighted with the signal-to-noise ratios estimated with the respective spatial received signals.

In another aspect, the electronic device according to an embodiment of the present disclosure may calibrate a frequency of a local frequency generator with the estimated carrier frequency offset. The embodiment is described with reference to FIG. 2 below.

Figure 2:
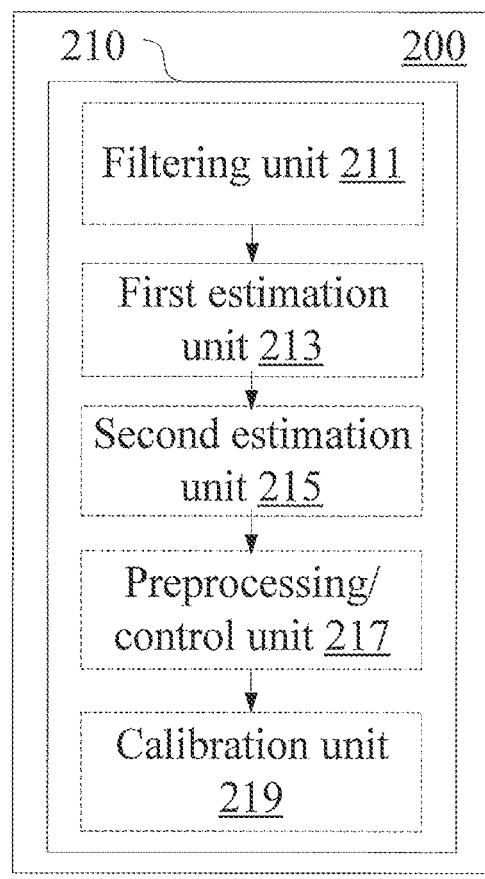
FIG. 2 is a block diagram showing a configuration example of an electronic device for wireless communication according to another embodiment.

As shown in FIG. 2, an electronic device 200 for wireless communication according to an embodiment includes at least one processor 200. The processor 200 includes a filtering unit 211, a first estimation unit 213, a second estimation 215, a preprocessing/control unit 217 and a calibration unit 219. The filtering unit 211, the first estimation unit 213, the second estimation unit 215 and the preprocessing/control unit 217 are respectively similar to the filtering unit 111, the first estimation unit 113, the second estimation unit 115 and the preprocessing/control unit 117 described above with reference to FIG. 1, for which the detailed descriptions are omitted here.

The calibration unit 219 is configured to calibrate a frequency of a local frequency generator based on the carrier frequency offset estimated by the second estimation unit 215, thereby reducing a carrier frequency offset caused by frequency inconsistency of the receiving and transmitting ends.

It should be noted that, the above electronic device 100 for wireless communication and electronic device 200 for wireless communication may operate as a user equipment (UE). In this case, the electronic devices, for example, can perform the above processing on a downlink signal from a base station or a signal from another user equipment (for example, in the case of direct communication between devices). However, the invention is not limited thereto. For example, the embodiments of the present disclosure may be also applied at the base station side to estimate, for example, a Doppler shift and a carrier frequency offset of an uplink signal from the user equipment, and to perform corresponding processing based on the estimating result.

In at least one embodiment of the present disclosure, the frequency offset generated by frequency inconsistency of the receiving and transmitting ends and the Doppler shift generated by the relative movement between the receiving and transmitting ends are estimated jointly, by using the signals filtered by multiple spatial filters. During a transmission of a signal, a frequency preprocessing is performed on the transmission signal by using the Doppler shift and frequency offset parameters estimated from the received signal and parameters of the respective spatial filters, thereby improving the throughput performance of the system in a fast time-varying channel environment.

Specifically, in the fast time-varying channel environment, a Doppler Effect of a signal at a receiving end cannot be suppressed with the related technologies in the case that there is a frequency offset generated by frequency inconsistency of the receiving and transmitting ends. In at least one embodiment of the present disclosure, the Doppler effect of the signal at the receiving end is suppressed by performing spatial filtering on the received signal, performing a binary parameter ($f_A$ and $f_d$) joint estimation with the weighted least square method and performing a frequency preprocessing on the transmission signal based on corresponding spatial filter parameters. The embodiments of the present disclosure have one of the following technical effects.

1) It solves the problem in the related technologies that fast-changing Doppler shift parameter cannot be tracked in the case of a fast time-varying channel environment, in particular in the case that a user equipment moves close to a base station and performs a handover. The performance of the system when moving close to the base station and performing a handover is improved. Thus it solves the problem of frequent call drops and handover failures caused by that the fast-changing Doppler shift parameter cannot be tracked by the system in the case of the fast time-varying channel environment.

2) It solves the problem in the related technologies that the Doppler effect at the receiving end cannot be effectively suppressed with the frequency preprocessing method in the case of inconsistent oscillator frequencies of the receiving end and the transmitting end, in the fast time-varying channel environment.

3) During a signal transmission, by performing the frequency preprocessing in different spatial domains with different spatial filter parameters, it solves a problem in the related technologies that a frequency preprocessing is difficult to be performed when a terminal simultaneously communicates with two or more base transceiver stations.

4) With the closed-loop Doppler control, a probability of frequency tracking out-of-step is reduced, thereby improving the robustness of the system in the fast time-varying channel environment.

In addition, it should be noted that, the effectiveness of the solutions of the invention is not limited to any existing wireless communication system standard, and the expected effect of the present disclosure can be achieved as long as antennas at the receiving end are array antennas.

Figure 6:
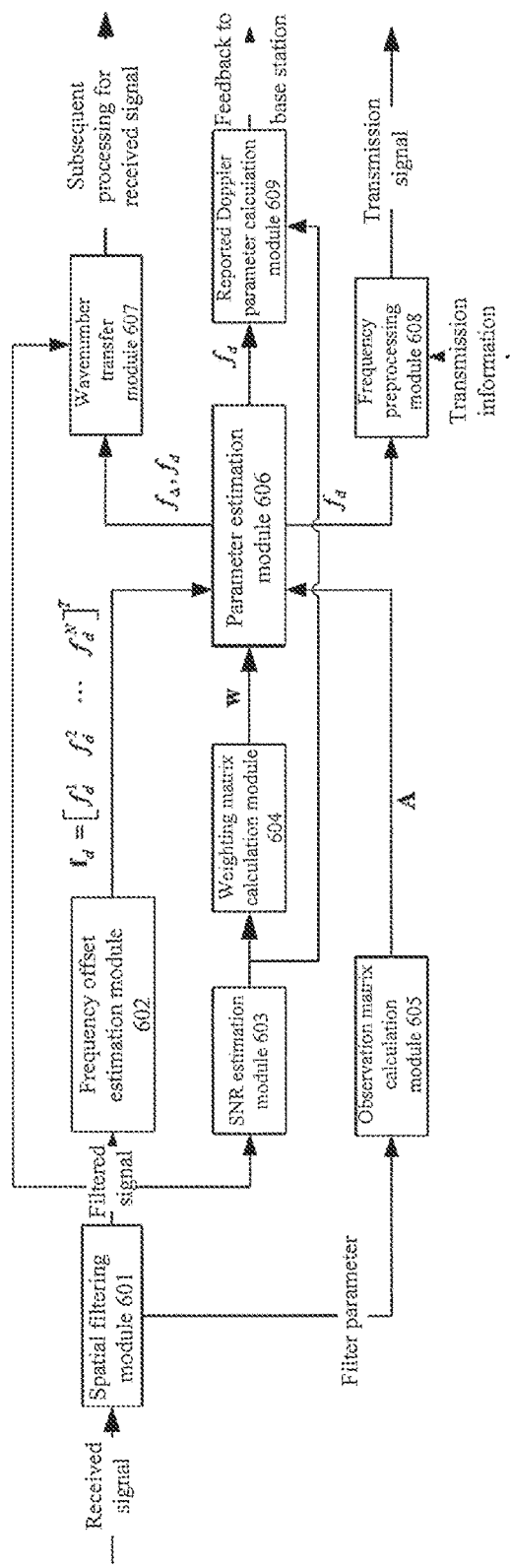
FIG. 6 is a block diagram showing a configuration example of a user equipment according to an exemplary embodiment.
Figure 7:
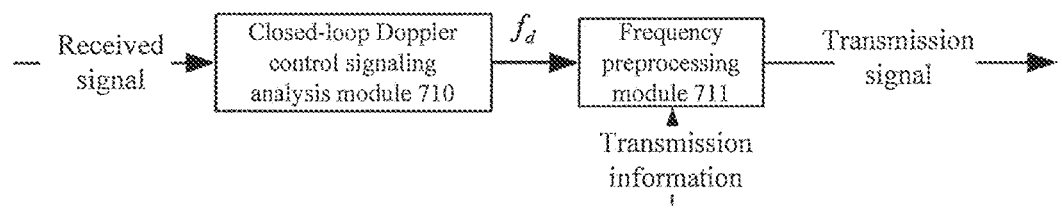
FIG. 7 is a block diagram showing a configuration example of a base station according to an exemplary embodiment.

Next, configuration examples of a user equipment and a corresponding base station in which the closed-loop Doppler control can be performed according to exemplary embodiments of the present disclosure are described respectively in conjunction with FIG. 6 and FIG. 7. It should be understood that the invention is not limited to details in the examples below.

As shown in FIG. 6, a received signal is firstly inputted to a spatial filtering module 601. The spatial filtering module 601 performs spatial-filtering on the received signal, and output a spatially-filtered signal and spatial filtering parameter information.

The spatially-filtered signal is inputted to a frequency offset estimation module 602 and a signal-to-noise ratio estimation module 603. The module 602 estimates frequency offsets in spatial domains, $f_d=[f_d^1\ f_d^2\ \ldots\ f_d^N]^T$, with a frequency offset estimation algorithm, and outputs the frequency offsets to a parameter estimation module 606. The module 603 estimates signal-to-noise ratios of the spatially-filtered signals and outputs the estimating results to a weighted matrix calculation module 604.

The module 604 calculates a weighted matrix w and outputs the calculation result to the module 606.

Besides, the module 601 outputs the spatial filter parameter to an observation matrix calculation module 605. The module 605 calculates an observation matrix A and outputs the calculation result to the module 606. The module 606 estimates parameters $f_A$ and $f_d$ with a weighted least square algorithm and outputs $f_A$ and $f_d$ to a frequency preprocessing module 608.

The module 608 performs a frequency preprocessing on transmission information with $f_d$. A reported Doppler parameter calculation module 609 calculates a reported Doppler parameter with the outputs of the module 603 and the module 606 and transmits the parameter to the base station, to achieve a closed-loop Doppler control.

Optionally, a wavenumber transfer module 607 may perform a wavenumber spectrum transfer on the output signal of the module 601 by using the estimated $f_A$ and $f_d$, and outputs the transferring result to a subsequent receiver module for processing.

As shown in FIG. 7, the base station firstly extracts and analyzes the Doppler parameter reported by the terminal from the received signal with a closed-loop Doppler parameter analysis module 710. Then, a frequency preprocessing module 711 performs a frequency preprocessing on information to be transmitted with the output of the module 710.

Figure 8:
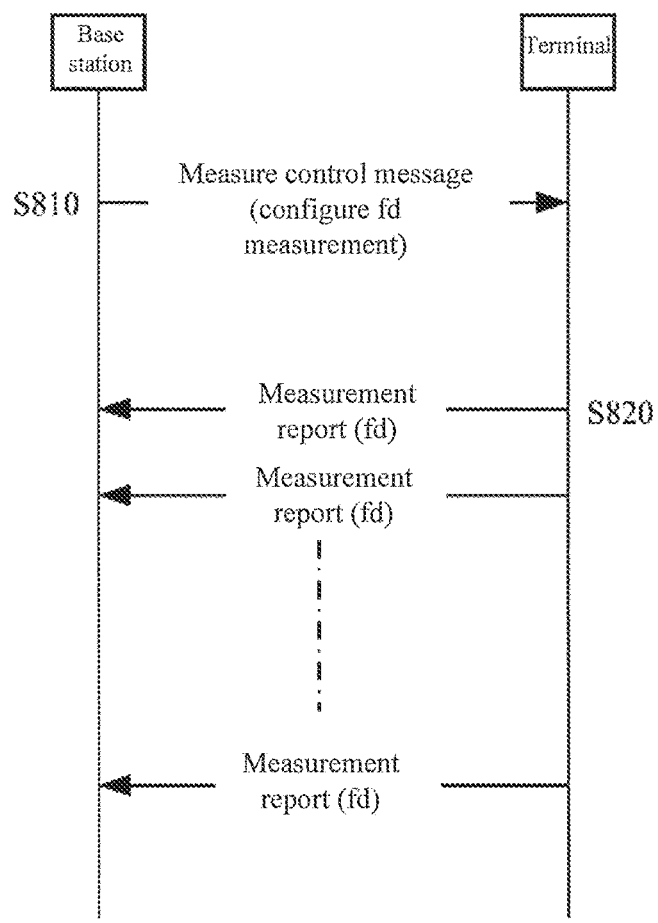
FIG. 8 is a schematic diagram for illustrating an information interaction process between a base station and a user equipment in an exemplary embodiment.

In addition, FIG. 8 is a schematic diagram showing signaling interaction between the base station and the terminal which perform the above closed-loop Doppler control.

As shown in FIG. 8, in step S810, the base station transmits a measurement control message to instruct the terminal to measure a current value of $f_d$ periodically. For example, a measurement report event is triggered in the case that the value of $f_d$ exceeds a certain threshold. Then, the terminal periodically reports the currently-measured value of $f_d$ (S820). The threshold may be determined in a way of computer simulation.

Some methods and processes are apparently disclosed in the above description of the device according to the embodiments of the present disclosure. Hereinafter, a wireless communication method according to an embodiment of the present disclosure is described without repeating details described above.

Figure 3:
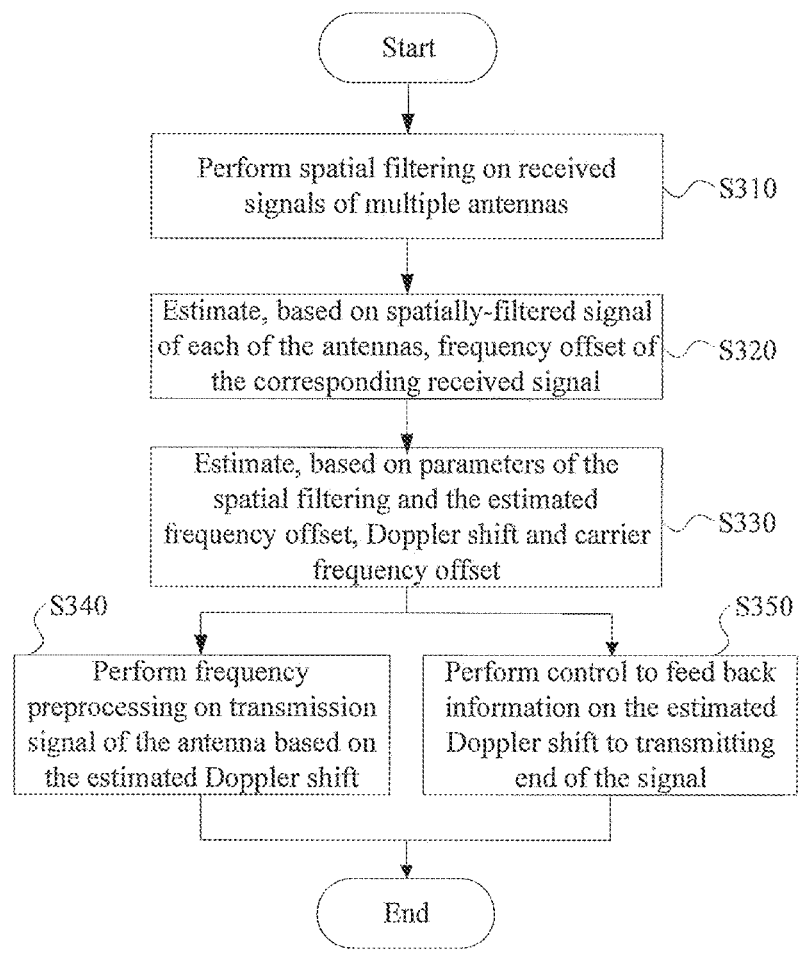
FIG. 3 is a flowchart showing a process example of a wireless communication method according to an embodiment of the present disclosure.

As shown in FIG. 3, a wireless communication method according to an embodiment includes steps S310 to S340.

In step S310, spatial filtering is performed on received signals of multiple antennas.

In step S320, based on the spatially-filtered signal of each of the antennas, a frequency offset of the received signal is estimated.

In step S330, a Doppler shift generated by a relative movement between a receiving end and a transmitting end of the received signal and a carrier frequency offset generated by frequency inconsistency of the receiving end and the transmitting end is estimated based on parameters of the spatial filtering and the estimated frequency offset.

In step S340, a frequency preprocessing is performed on a transmission signal of the antenna based on the estimated Doppler shift.

Alternatively or additionally, in step S350, control is performed to feed back information on the estimated Doppler shift to the transmitting end of the signal.

According to an embodiment, in step S330, the Doppler shift and the carrier frequency offset are estimated based on a relation that the frequency offset is a linear combination of the Doppler shift and the carrier frequency offset.

According to an embodiment, in step S330, the Doppler shift and the carrier frequency offset may be estimated with a weighted least square method, and weighting is performed based on signal-to-noise ratios of spatially-filtered signals of multiple antennas.

According to an embodiment, the relation of the linear combination is determined based on a signal-to-noise ratio of the spatially-filtered signal of each of the antennas, a direction angle $\varphi_n$ for the spatial filtering and a direction angle $\theta_R$ of the relative movement between the receiving end and the transmitting end of the received signal.

According to an embodiment, estimation values of the Doppler shift and carrier frequency offset are calculated with an observation matrix and a weighting matrix. The observation matrix is related to the direction angle $\varphi_n$ and the direction angle $\theta_R$, and the weighting matrix is related to the signal-to-noise ratio of the spatially-filtered signal.

According to an embodiment, the signal-to-noise ratio is estimated with a self-correlation method.

According to an embodiment, the observation matrix is predetermined based on the direction angle $\varphi_n$ and the direction angle $\theta_R$.

According to an embodiment, the weighting matrix is determined based on the signal-to-noise ratio estimated frame-by-frame.

According to an embodiment, in step S320, the frequency offset is estimated with an estimation method based on training sequence or a blind estimation method based on signal statistical information.

According to an embodiment, the Doppler shift and the carrier frequency offset are estimated frame-by-frame for a received signal in step S330.

According to an embodiment, the frequency preprocessing in step S340 includes: performing a preprocessing by adopting different Doppler shift estimations for different spatial directions, and weighting a transmission signal with the signal-to-noise ratios estimated by using the spatial received signals.

According to an embodiment, in step S350, the information on the estimated Doppler shift further contains: a direction angle for a spatial filtering corresponding to a signal with a highest signal-to-noise ratio among the spatially-filtered signals.

Figure 4:
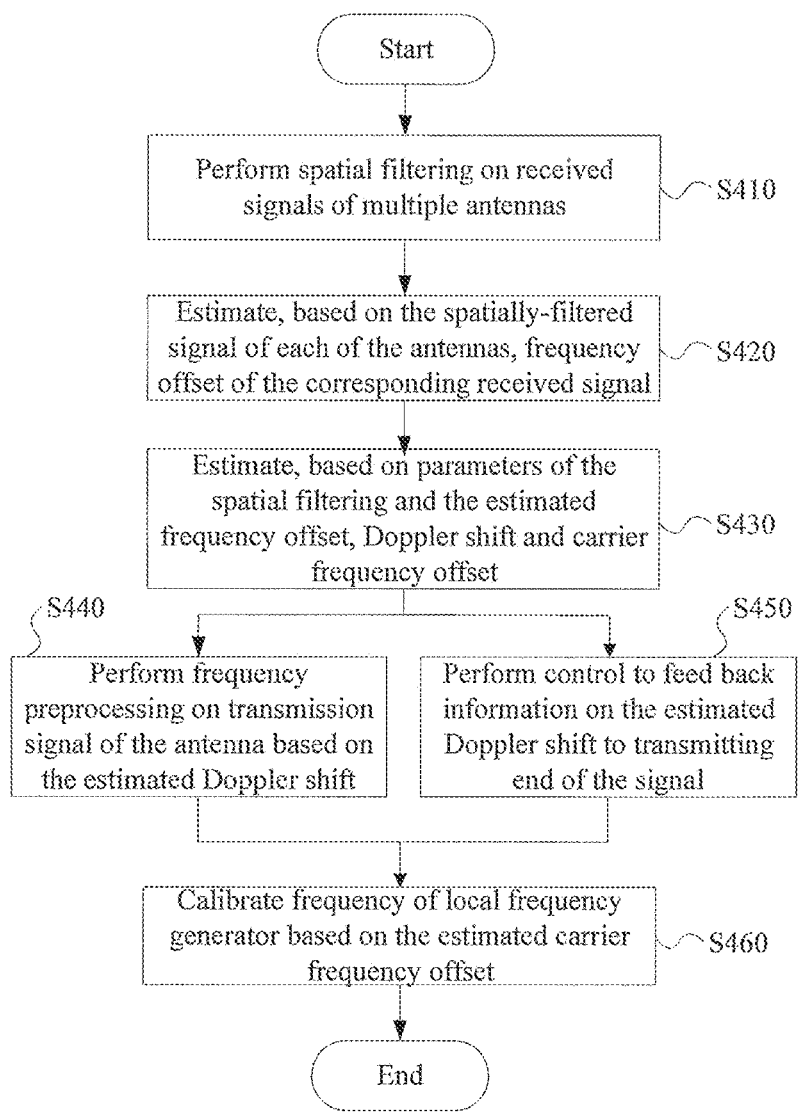
FIG. 4 is a flowchart showing a process example of a wireless communication method according to another embodiment.

FIG. 4 shows a process example of a wireless communication method according to another embodiment.

Steps S410 to 450 shown in FIG. 4 are similar to steps S310 to S350 described with reference to FIG. 3. In addition, the method according to embodiment further includes step S460 of calibrating a frequency of a local frequency generator based on the estimated carrier frequency offset.

Figure 5:
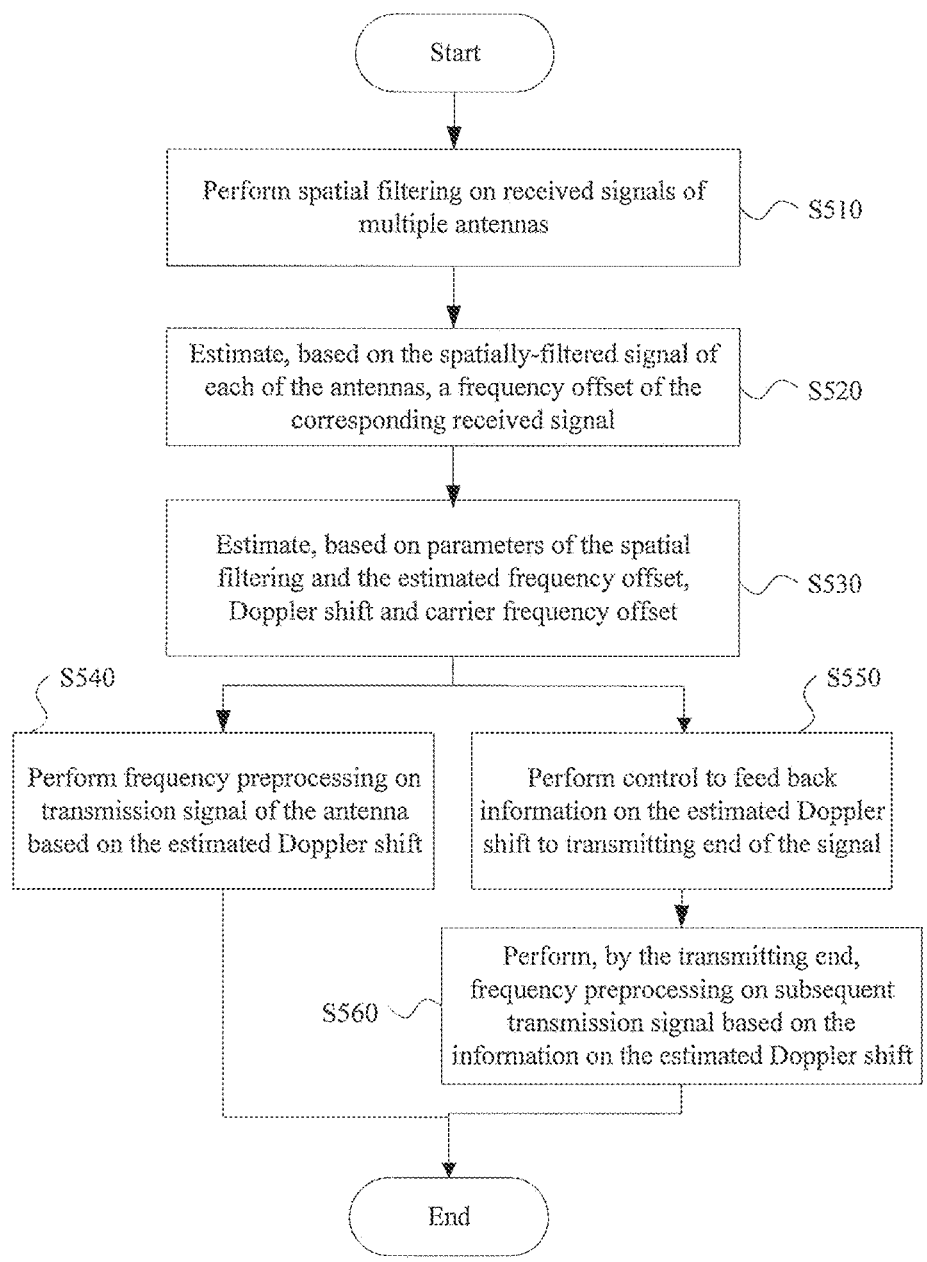
FIG. 5 is a flowchart showing a process example of a wireless communication method according to yet another embodiment.

FIG. 5 shows a process example of a wireless communication method according to another embodiment.

Steps S510 to S550 shown in FIG. 5 are similar to steps S310 to S350 described with reference to FIG. 3. In addition, the method according to the embodiment further includes step S560 of performing, by the transmitting end, a frequency preprocessing on a subsequent transmission signal based on information on the estimated Doppler shift.

Figure 9:
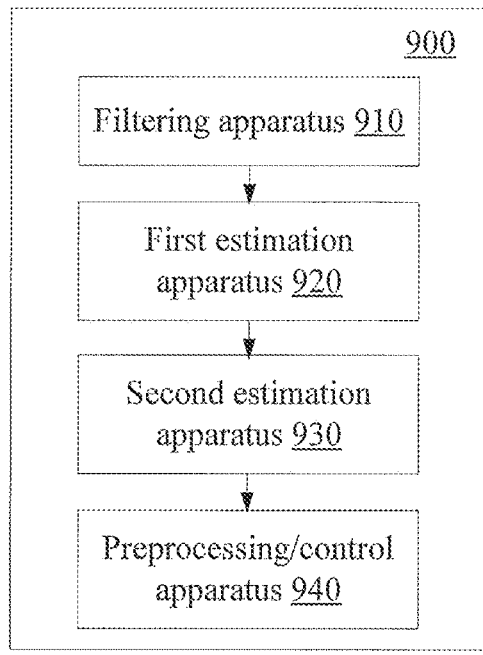
FIG. 9 is a block diagram showing a configuration example of an electronic device for wireless communication according to an embodiment of the present disclosure.

Besides, FIG. 9 shows a configuration example of an electronic device for wireless communication according to an embodiment of the present disclosure.

An electronic device 900 according to an embodiment includes a filtering apparatus 910, a first estimation apparatus 920, a second estimation apparatus 930 and a preprocessing/control apparatus 940.

The filtering apparatus 910 is configured to perform spatial filtering on received signals of multiple antennas.

The first estimation apparatus 920 is configured to estimate, based on the spatially-filtered signal of each of the antennas, a frequency offset of the received signal.

The second estimation apparatus 930 is configured to estimate a Doppler shift generated by a relative movement between a receiving end and a transmitting end of the received signal and a carrier frequency offset generated by frequency inconsistency of the receiving end and the transmitting end, based on parameters of the spatial filtering and the estimated frequency offset.

The preprocessing/control apparatus 940 is configured to perform a frequency preprocessing on a transmission signal of the antenna based on the estimated Doppler shift, and/or perform control to feed back information on the estimated Doppler shift to the transmitting end of the signal.

As examples, the steps of the above methods and the modules and/or units of the above devices can be realized by software, firmware, hardware or combinations thereof. In the case where the present disclosure is realized by software or firmware, a program constituting the software implementing the above methods is installed in a computer with a dedicated hardware structure (e.g. a general-purpose computer 1000 shown in FIG. 10) from a storage medium or network, where the computer is capable of implementing various functions when installed with various programs.

Figure 10:
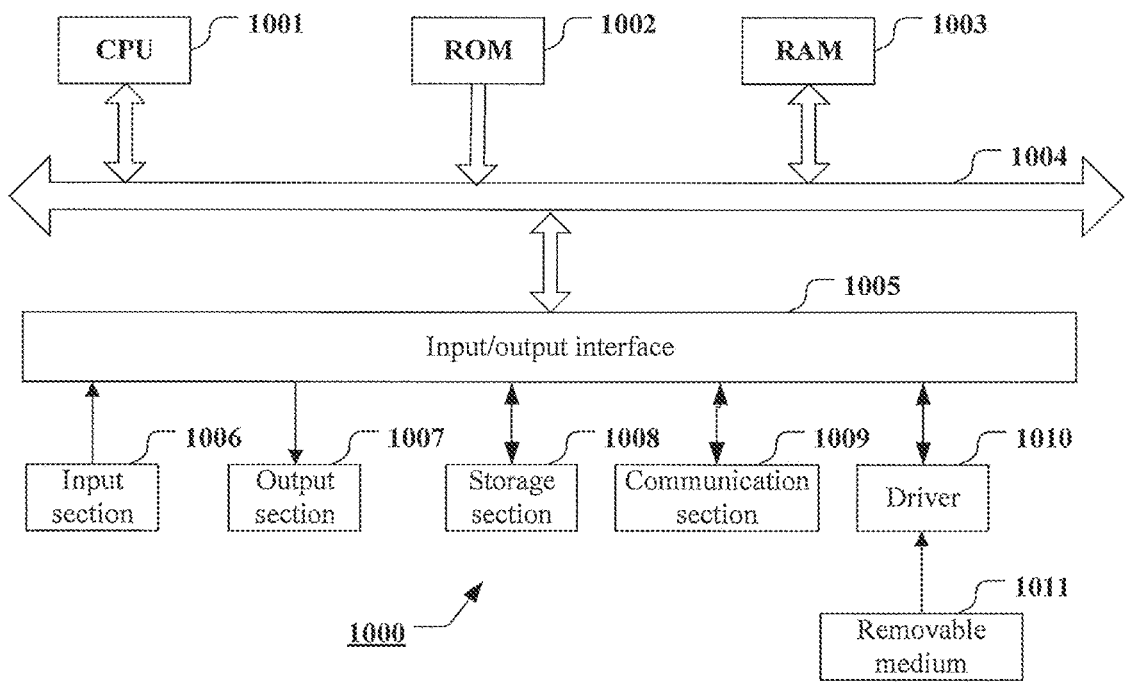
FIG. 10 is a block diagram showing an exemplary structure of a computer implementing the method and device according to the present disclosure.

In FIG. 10, a central processing unit (CPU) 1001 executes various processing in response to a program stored in a read-only memory (ROM) 1002 or a program loaded to a random access memory (RAM) 1003 from a storage section 1008. The data for the various processing of the CPU 1001 may be stored in the RAM 1003 as needed. The CPU 1001, ROM 1002 and RAM 1003 are linked with each other via a bus 1004. An input/output interface 1005 is also linked to the bus 1004.

The following components are linked to the input/output interface 1005: an input section 1006 (including a keyboard, a mouse and the like), an output section 1007 (including displays such as a cathode ray tube (CRT), a liquid crystal display (LCD), a speaker and the like), a storage section 1008 (including a hard disc and the like), and a communication section 1009 (including a network interface card such as a LAN card, a modem and the like). The communication section 1009 performs communication processing via a network such as the Internet. A driver 1010 may also be linked to the input/output interface 1005 as needed. A removable medium 1011 such as a magnetic disc, an optical disc, a magnetic optical disc and a semiconductor memory may be installed in the driver 1010 as needed, so that the computer program read therefrom is installed in the storage section 1008 as appropriate.

In the case where the foregoing series of processing is achieved with software, programs forming the software are installed from a network such as the Internet or a storage medium such as the removable medium 1011.

It should be appreciated by those skilled in the art that the storage medium is not limited to the removable medium 1011 shown in FIG. 10, which has program stored therein and is distributed separately from the apparatus so as to provide the programs to users. The removable medium 1011 may be, for example, a magnetic disc (including a floppy disc (registered trademark)), a compact disc (including a compact disc read-only memory (CD-ROM) and a digital versatile disc (DVD)), a magneto optical disc (including a mini disc (MD) (registered trademark)), and a semiconductor memory. Alternatively, the storage medium may be the hard discs included in the ROM 1002 and the storage section 1008 in which programs are stored, and can be distributed to users along with the device in which they are incorporated.

In addition, a program product storing machine-readable instruction codes is further provided according to the embodiments of the present disclosure. The method according to the above embodiments of the present disclosure can be performed when the instruction codes are read and executed by a machine.

Accordingly, a storage medium for carrying the program product in which machine-readable instruction codes are stored is also provided in the present disclosure. The storage medium includes but is not limited to a floppy disc, an optical disc, a magnetic optical disc, a memory card, a memory stick and the like.

The embodiments of the present disclosure may further relate to the following electronic device. In the case that the electronic device is applied at a base station side, the electronic device may be implemented as any types of evolved node B (eNB), such as a macro eNB and a small eNB. The small eNB may be an eNB of a cell having a smaller coverage than the macro cell, such as a pico-cell eNB, a micro eNB and a home (femto) eNB. Alternatively, the electronic device may be implemented as any other types of base stations, such as a NodeB and a base transceiver station (BTS). The electronic device may include a main body (also referred to as a base station device) configured to control wireless communication, and one or more remote radio heads (RRHs) arranged at a position different from a position of the main body. In addition, various types of terminals to be described below can operate as a base station by temporarily or semi-persistently performing a function of the base station.

When being applied at a user equipment side, the electronic device may be implemented as a mobile terminal (such as a smart phone, a panel personnel computer (PC), a laptop PC, a portable game terminal, a portable/dongle mobile router and a digital camera) or a vehicle terminal (such as an automobile navigation device). In addition, the electronic device may be a wireless communication module (such as an integrated circuit module including one or more wafers) mounted on each of the above terminals. [Application examples of a terminal device]

Figure 11:
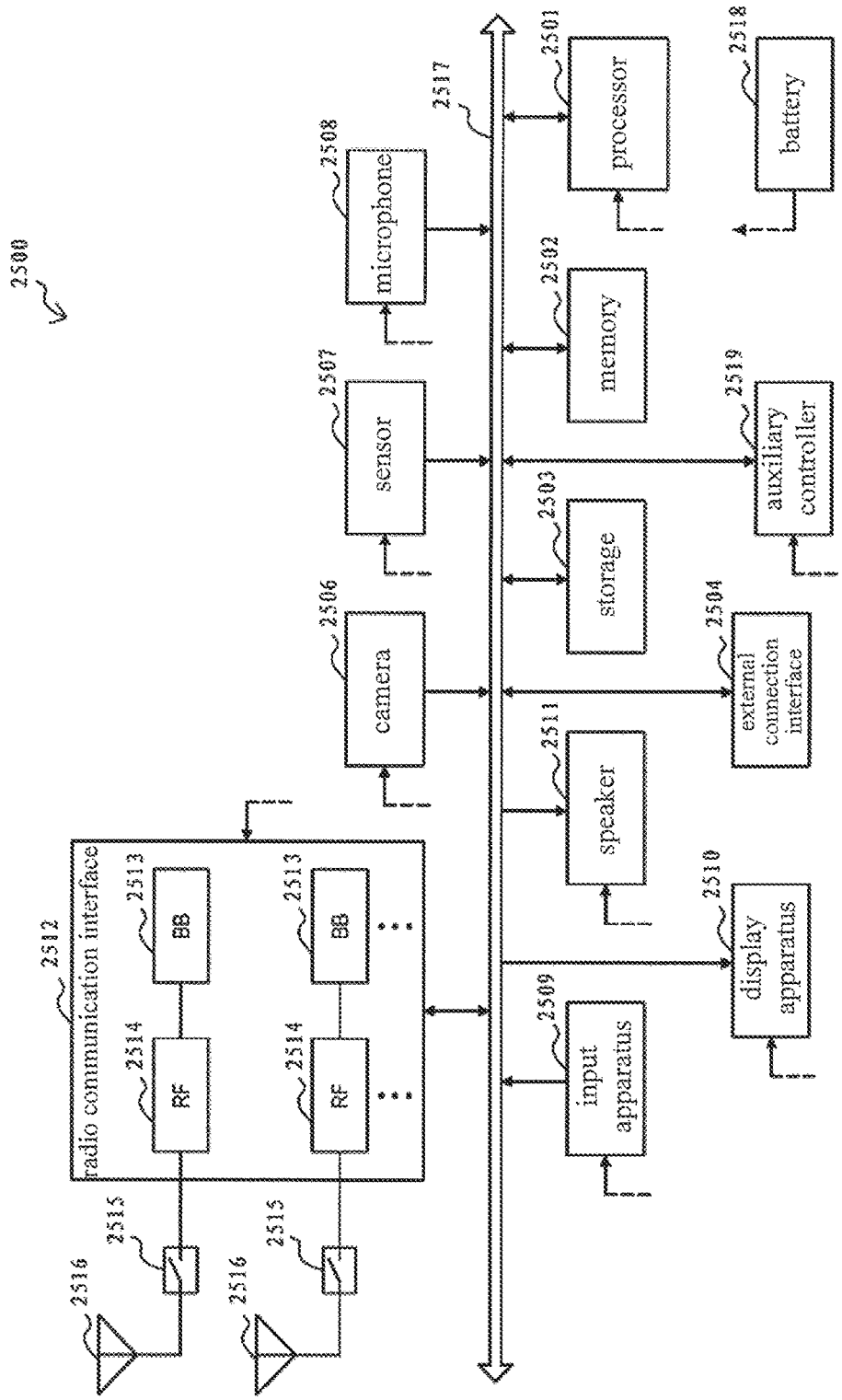
FIG. 11 is a block diagram showing an example of a schematic configuration of a smart phone to which a technology according to the present disclosure can be applied.

FIG. 11 is a block diagram showing an example of a schematic configuration of a smart phone 2500 to which the technology according to the present disclosure may be applied. The smart phone 2500 includes a processor 2501, a memory 2502, a storage 2503, an external connection interface 2504, a camera 2506, a sensor 2507, a microphone 2508, an Input apparatus 2509, a display apparatus 2510, a speaker 2511, a radio communication interface 2512, one or more antenna switches 2515, one or more antennas 2516, a bus 2517, a battery 2518 and an auxiliary controller 2519.

The processor 2501 may be for example a CPU or a system on chip (SoC), and controls functions of an application layer and an additional layer of the smart phone 2500. The memory 2502 includes RAM and ROM, and stores programs executed by the processor 2501 and data. The storage 2503 may include a storage medium such as a semiconductor memory and a hard disk. The external connection interface 2504 refers to an interface connecting an external device (such as a memory card and a universal serial bus (USB) device) to the smart phone 2500.

The camera 2506 includes an image sensor (such as a charge-coupled device (CCD) and a complementary metal oxide semiconductor (CMOS)), and generates a captured image. The sensor 2507 may include a group of sensors such as a measurement sensor, a gyroscope sensor, a geomagnetic sensor and an acceleration sensor. The microphone 2508 converts voice inputted to the smart phone 2500 into an audio signal. The Input apparatus 2509 includes for example a touch sensor configured to detect touch on a screen of the display apparatus 2510, a keypad, a keyboard, a button or a switch, and receives an operation or information inputted by the user. The display apparatus 2510 includes a screen (such as a liquid crystal display (LCD) and an organic light-emitting diode (OLED) display), and displays an output image of the smart phone 2500. The speaker 2511 converts the audio signal outputted from the smart phone 2500 into voice.

The radio communication interface 2512 supports any cellular communication scheme (such as LTE and LTE-advanced), and performs wireless communication. The radio communication interface 2512 may generally include for example a BB processor 2513 and an RF circuit 2514. The BB processor 2513 may perform for example coding/decoding, modulation/demodulation and multiplexing/demultiplexing, and perform various types of signal processing for wireless communication. Meanwhile, the RF circuit 2514 may include for example a frequency mixer, a filter and an amplifier, and transmit and receive a wireless signal via the antenna 2516. The radio communication interface 2512 may be a chip module on which the BB processor 2513 and the RF circuit 2514 are integrated. As shown in FIG. 11, the radio communication interface 2512 may include multiple BB processors 2513 and multiple RF circuits 2514. Although FIG. 11 shows the example in which the radio communication interface 2512 includes multiple BB processors 2513 and multiple RF circuits 2514, the radio communication interface 2512 may include a single BB processor 2513 or a single RF circuit 2514.

In addition to the cellular communication scheme, the radio communication interface 2512 may support an additional type of wireless communication scheme, such as a short-distance wireless communication scheme, a near field communication scheme and a wireless local area network (LAN) scheme. In this case, the radio communication interface 2512 may include a BB processor 2513 and an RF circuit 2514 for each of the wireless communication schemes.

Each of the antenna switches 2515 switches a connection destination of the antenna 2516 between multiple circuits (such as circuits for different wireless communication schemes) included in the radio communication interface 2512.

Each of the antennas 2516 includes one or more antenna elements (such as multiple antenna elements included in the MIMO antenna), and is for the radio communication interface 2512 to transmit and receive a wireless signal. As shown in FIG. 11, the smart phone 2500 may include multiple antennas 2516. Although FIG. 11 shows the example in which the smart phone 2500 includes multiple antennas 2516, the smart phone 2500 may include a single antenna 2516.

In addition, the smart phone 2500 may include antennas 2516 for different wireless communication schemes. In this case, the antenna switch 2515 may be omitted in the configuration of the smart phone 2500.

The processor 2501, the memory 2502, the storage 2503, the external connection interface 2504, the camera 2506, the sensor 2507, the microphone 2508, the Input apparatus 2509, the display apparatus 2510, the speaker 2511, the radio communication interface 2512 and the auxiliary controller 2519 are connected with one another via the bus 2517. The battery 2518 supplies power to the modules of the smart phone 2500 shown in FIG. 11 via a feed line. The feed line is partially shown with a dashed line in the figure. The auxiliary controller 2519, for example, operates a minimum necessary function of the smart phone 2500 in a sleep mode.

In the smart phone 2500 shown in FIG. 11, at least a portion of the functions of the units or modules described with reference to FIGS. 1, 2 and 6 may be implemented by the processor 2501 or the auxiliary controller 2519. For example, an electric power consumption of the battery 2518 can be reduced in a way of performing a portion of functions of the processor 2501 by the auxiliary controller 2519. In addition, the processor 2501 or auxiliary controller 2519 can perform at least a portion of functions of the units or modules described with reference to FIGS. 1, 2 and 6 by executing programs stored in the memory 2502 or storage 2503.

[Application Examples of a Base Station]

Figure 12:
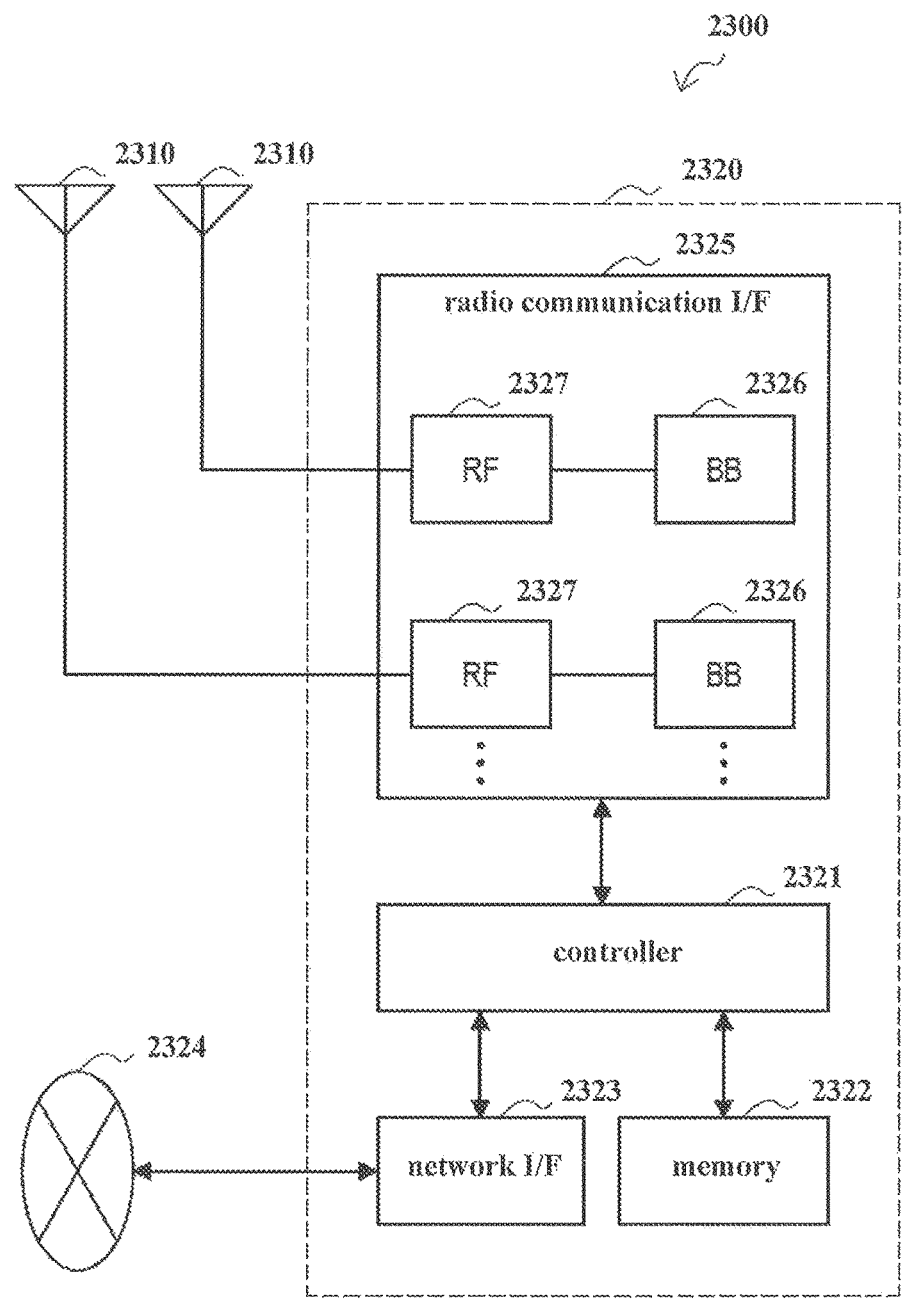
FIG. 12 is a block diagram showing an example of a schematic configuration of an evolved base station (eNB) to which a technology according to the present disclosure can be applied.

FIG. 12 is a block diagram showing an example of a schematic configuration of an eNB to which the technology according to the present disclosure can be applied. An eNB 2300 includes one or more antennas 2310 and a base station device 2320. The base station device 2320 may be connected to each of the antennas 2310 via a radio frequency (RF) cable.

Each of the antennas 2310 includes one or more antenna elements (such as multiple antenna elements included in a multiple-input multiple-output (MIMO) antenna), and is for the base station device 2320 to transmit and receive a wireless signal. As shown in FIG. 12, the eNB 2300 may include multiple antennas 2310. For example, the multiple antennas 2310 may be compatible with multiple frequency bands used by the eNB 2300. Although FIG. 12 shows the example in which the eNB 2300 includes multiple antennas 2310, the eNB 2300 may include a single antenna 2310.

The base station device 2320 includes a controller 2321, a memory 2322, a network interface 2323 and a radio communication interface 2325.

The controller 2321 may be for example a CPU or a DSP, and operates various functions of a high layer of the base station device 2320. For example, the controller 2321 generates a data package based on data of a signal processed by the radio communication interface 2325, and transfers the generated package via the network interface 2323. The controller 2321 may bundle data from multiple baseband processors to generate a bundling package, and transfers the generated bundling package. The controller 2321 may have a logical function for performing the following controls: radio resource control, radio bearer control, mobility management, admission control and scheduling. The control may be performed in conjunction with a nearby eNB or core network node. The memory 2322 includes RAM and ROM, and stores programs to be executed by the controller 2321 and various types of control data (such as a terminal list, transmission power data and scheduling data).

The network interface 2323 is a communication interface for connecting the base station device 2320 to a core network 2324. The controller 2321 may communicate with a core network node or another eNB via the network interface 2323. In this case, the eNB 2300 may be connected with the core network node or other eNBs via a logic interface (such as an interface S1 and an interface X2). The network interface 2323 may be a wired communication interface or a radio communication interface for wireless backhaul routing. If the network interface 2323 is a radio communication interface, the network interface 2323 may use a frequency band for wireless communication higher than that used by the radio communication interface 2325.

The radio communication interface 2325 supports any cellular communication scheme (such as Long Term Evolution (LTE) and LTE-advanced), and provides a wireless connection to a terminal located in a cell of the eNB 2300 via the antenna 2310. The radio communication interface 2325 may generally include for example a baseband (BB) processor 2326 and an RF circuit 2327. The BB processor 2326 may perform for example coding/decoding, modulation/demodulation and multiplexing/demultiplexing, and performs various types of signal processing of layers (such as L1, Media Access Control (MAC), Radio Link Control (RLC) and Packet Data Convergence Protocol (PDCP)). Instead of the controller 2321, the BB processor 2326 may have a portion or all of the above logical functions. The BB processor 2326 may be a memory storing communication control programs, or a module including a processor and a related circuit which are configured to execute programs. The function of the BB processor 2326 may be changed when the programs are updated. The module may be a card or blade inserted into the slot of the base station device 2320. Alternatively, the module may be a chip mounted on the card or the blade. Meanwhile, the RF circuit 2327 may include for example a frequency mixer, a filter and an amplifier, and transmit and receive a wireless signal via the antenna 2310.

As shown in FIG. 12, the radio communication interface 2325 may include multiple BB processors 2326. For example, the multiple BB processors 2326 may be compatible with the multiple frequency bands used by the eNB 2300. As shown in FIG. 12, the radio communication interface 2325 may include multiple RF circuits 2327. For example, the multiple RF circuits 2327 may be compatible with multiple antenna elements. Although FIG. 12 shows an example in which the radio communication interface 2325 includes multiple BB processors 2326 and multiple RF circuits 2327, the radio communication interface 2325 may include a single BB processor 2326 or a single RF circuit 2327.

In the eNB 2300 shown in FIG. 12, at least a portion of functions of the units or modules described in conjunction with FIGS. 1, 2 and 7 may be realized by the controller 2321. For example, the controller 2321 may perform at least a portion of functions of the units or modules described in conjunction with FIGS. 1, 2 and 7 by performing programs stored in the memory 2322. [Application example of an automobile navigation device]

Figure 13:
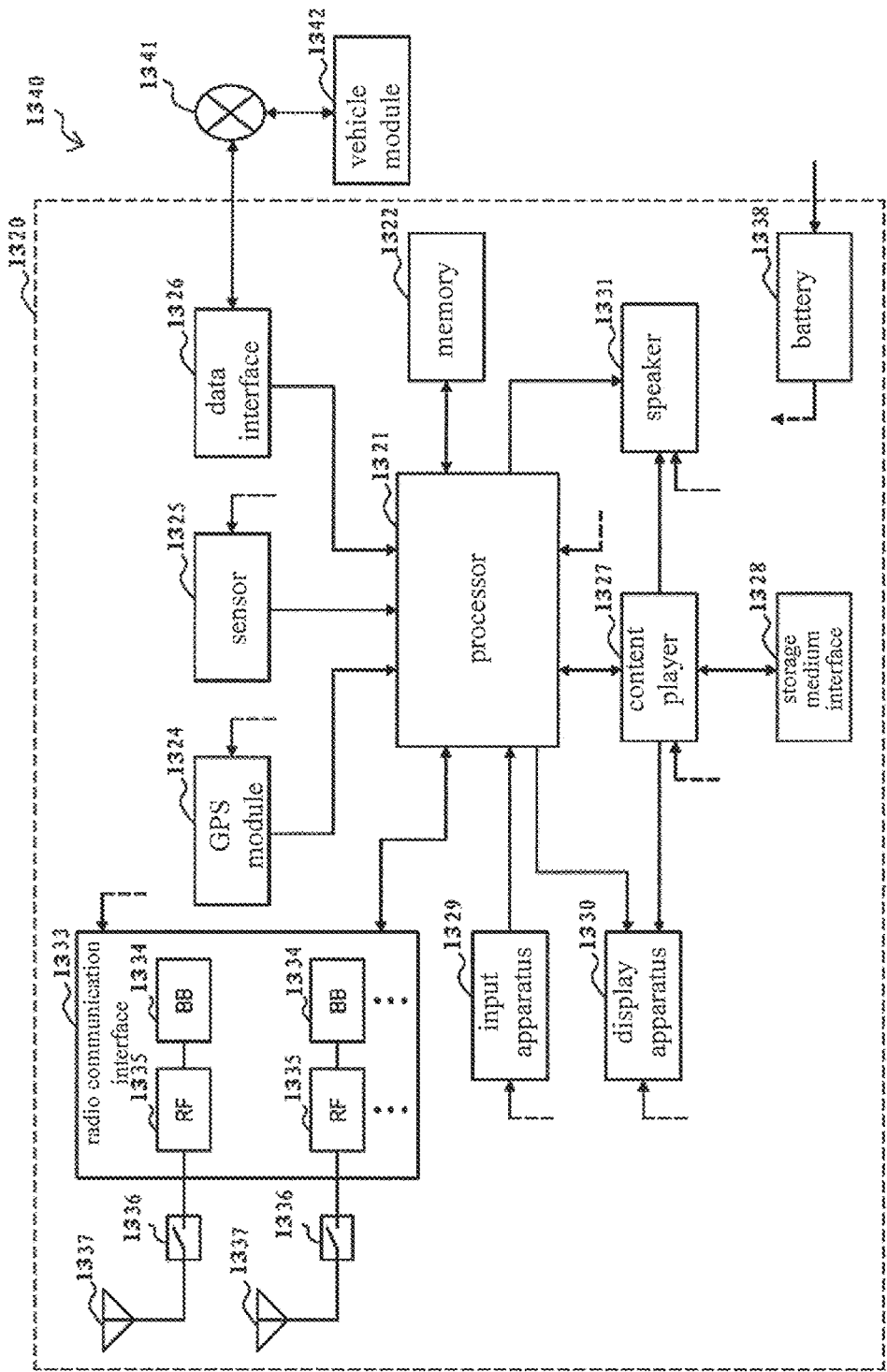
FIG. 13 is a block diagram of an example of a schematic configuration of an automobile navigation device to which a technology according to the present disclosure can be applied.

FIG. 13 is a block diagram showing an example of a schematic configuration of an automobile navigation device 1320 to which the technology according to the present disclosure may be applied. The automobile navigation device 1320 includes a processor 1321, a memory 1322, a global positioning system (GPS) module 1324, a sensor 1325, a data interface 1326, a content player 1327, a storage medium interface 1328, an Input apparatus 1329, a display apparatus 1330, a speaker 1331, a radio communication interface 1333, one or more antenna switches 1336, one or more antennas 1337 and a battery 1338.

The processor 1321 may be for example a CPU or an SoC, and controls a navigation function and additional function of the automobile navigation device 1320. The memory 1322 includes RAM and ROM, and stores programs executed by the processor 1321 and data.

The GPS module 1324 determines the location of the automobile navigation device 1320 (such as latitude, longitude and height) with a GPS signal received from a GPS satellite. The sensor 1325 may include a group of sensors such as a gyroscope sensor, a geomagnetic sensor and an air pressure sensor. The data interface 1326 is connected to for example an on-board network 1341 via a terminal not shown, and acquires data generated by the vehicle (such as vehicle speed data).

The content player 1327 reproduces contents stored in a storage medium (such as CD and DVD) which is inserted into the storage medium interface 1328. The Input apparatus 1329 includes for example a touch sensor configured to detect touch on a screen of the display apparatus 1330, a button or a switch, and receives an operation or information inputted by the user. The display apparatus 1330 includes a screen of a display such as an LCD or OLED, and displays an image of navigation function or the reproduced contents. The speaker 1331 outputs voice of the navigation function or the reproduced contents.

The radio communication interface 1333 supports any cellular communication scheme (such as LTE and LTE-advanced), and performs wireless communication. The radio communication interface 1333 may generally include for example a BB processor 1334 and an RF circuit 1335. The BB processor 1334 may perform for example coding/decoding, modulation/demodulation and multiplexing/demultiplexing, and perform various types of signal processing for wireless communication. Meanwhile, the RF circuit 1335 may include for example a frequency mixer, a filter and an amplifier, and transmit and receive a wireless signal via the antenna 1337. The radio communication interface 1333 may be a chip module on which the BB processor 1334 and the RF circuit 1335 are integrated. As shown in FIG. 13, the radio communication interface 1333 may include multiple BB processors 1334 and multiple RF circuits 1335. Although FIG. 13 shows the example in which the radio communication interface 1333 includes multiple BB processors 1334 and multiple RF circuits 1335, the radio communication interface 1333 may include a single BB processor 1334 or a single RF circuit 1335.

In addition to the cellular communication scheme, the radio communication interface 1333 may support an additional type of wireless communication scheme, such as a short-distance wireless communication scheme, a near field communication scheme and a wireless LAN scheme. In this case, the radio communication interface 1333 may include a BB processor 1334 and an RF circuit 1335 for each of the wireless communication schemes.

Each of the antenna switches 1336 switches a connection destination of the antenna 1337 between multiple circuits (such as circuits for different wireless communication schemes) included in the radio communication interface 1333.

Each of the antennas 1337 includes one or more antenna elements (such as multiple antenna elements included in the MIMO antenna), and is for the radio communication interface 1333 to transmit and receive a wireless signal. As shown in FIG. 13, the automobile navigation device 1320 may include multiple antennas 1337. Although FIG. 13 shows the example in which the automobile navigation device 1320 includes multiple antennas 1337, the automobile navigation device 1320 may include a single antenna 1337.

In addition, the automobile navigation device 1320 may include antennas 1337 for different wireless communication schemes. In this case, the antenna switch 1336 may be omitted in the configuration of the automobile navigation device 1320.

The battery 1338 supplies power to the modules of the automobile navigation device 1320 shown in FIG. 13 via a feed line. The feed line is partially shown with a dashed line in the drawing. The battery 1338 accumulates the power provided from the vehicle.

In the automobile navigation device 1320 shown in FIG. 13, the processor 1321 may perform at least a portion of functions of the units described in conjunction with FIG. 1 and FIG. 2 by executing programs stored in the memory 1322.

The technology according to the present disclosure may be further implemented as an on-board system (or a vehicle) 1340 including one or more of the automobile navigation device 1320, the on-board network 1341 and a vehicle module 1342. The vehicle module 1342 generates vehicle data (such as a vehicle speed, a motor speed and fault information) and outputs the generated data to the on-board network 1341.

In the above description of the embodiments of the present disclosure, features that are described and/or illustrated with respect to one embodiment may be used in the same way or in a similar way in one or more other embodiments, may be combined with or instead of the features of the other embodiments.

It should be emphasized that the term "comprises/comprising" used in this specification refers to the presence of features, elements, steps or components, but does not preclude the presence or addition of one or more other features, elements, steps or components.

In the above embodiments and examples, the steps and/or units are represented with reference numbers consists of numbers. It should be understood by those skilled in the art that, these reference numbers are only for convenience of the description and drawing, and are not intended to represent an order of the steps and units or to represent any other constraint.

In addition, the methods according to the present disclosure are not limited to be executed in the time sequence described in the specification, and may be executed in other time sequence, parallel or independently. Therefore, the execution order of the method described in the specification is not intended to limit the technical scope of the present disclosure.

While the present disclosure has been disclosed with reference to the specific embodiments thereof, it should be understood that all of the above embodiments and examples are illustrative rather than restrictive. Those skilled in the art will appreciate that various modifications, improvements and equivalents are possible, without departing from the spirit and scope of the appended claims. These modifications, improvements or equivalents are intended to be included within the protection scope of the present disclosure.

The invention claimed is:

1. An electronic device for wireless communication, comprising:
at least one processor configured to
perform spatial filtering respectively on received signals of a plurality of antennas to form corresponding spatially-filtered signals;
estimate, based on the corresponding spatially-filtered signal of each of the antennas, a frequency offset of the corresponding received signal;
estimate, based on parameters of the spatial filtering and the estimated frequency offset, a Doppler shift of the received signal caused by a relative movement between a receiving terminal and a transmitting terminal and a carrier frequency offset caused by frequency inconsistency of equipment at the receiving terminal and at the transmitting terminal; and
perform control to feedback information on the estimated Doppler shift to the transmitting terminal of the received signal, wherein at least the estimated Doppler shift is based on a linear combination of the Doppler shift and the carrier frequency offset, and the linear combination includes a direction angle $\theta_R$ of a relative movement between the receiving terminal and the transmitting terminal of the received signal.

2. The electronic device according to claim 1, wherein the at least one processor is further configured estimate the carrier frequency offset based on a relation that the frequency offset is a linear combination of the Doppler shift and the carrier frequency offset.

3. The electronic device according to claim 2, wherein the Doppler shift and the carrier frequency offset are estimated by using a weighted least square method, and wherein the weighting is performed based on signal-to-noise ratios of the respective spatially-filtered signals of the plurality of antennas.

4. The electronic device according to claim 2, wherein the relation of the linear combination is determined based on the signal-to-noise ratio of the spatially-filtered signal of each of the plurality of antennas, a direction angle $\phi_n$ for the spatial filtering and the direction angle $\theta_R$ of the relative movement between the receiving end and the transmitting end of the received signal.

5. The electronic device according to claim 4, wherein estimates of the Doppler shift and the carrier frequency offset are calculated using an observation matrix and a weighting matrix, wherein the observation matrix is related to the direction angle $\phi_n$ and the direction angle $\theta_R$, and the weighting matrix is related to the signal-to-noise ratio of the spatially-filtered signal.

6. The electronic device according to claim 5, wherein the observation matrix is predetermined based on the direction angle $\phi_n$ and the direction angle $\theta_R$.

7. The electronic device according to claim 5, wherein the weighting matrix is determined based on the signal-to-noise ratio estimated frame-by-frame.

8. The electronic device according to claim 1, wherein the frequency offset is estimated by using an estimation method based on training sequence or a blind estimation method based on signal statistical information.

9. The electronic device according to claim 3, wherein the signal-to-noise ratio is estimated by using a self-correlation method.

10. The electronic device according to claim 1, wherein the at least one processor is configured to estimate the Doppler shift and the carrier frequency offset frame-by-frame for the received signal.

11. The electronic device according to claim 1, wherein the at least one processor is configured to perform the frequency preprocessing via adoption of different Doppler shift estimations for different spatial directions, and weighting the transmission signal with signal-to-noise ratios estimated for the spatial received signals.

12. The electronic device according to claim 1, wherein the at least one processor is further configured to:
calibrate a frequency of a local frequency generator in at least one of the equipment at receiving terminal and the transmitting terminal based on the estimated carrier frequency offset.

13. The electronic device according to claim 1, wherein the information includes a direction angle of spatial filtering corresponding to the signal with a highest signal-to-noise ratio among the spatially-filtered signals.

14. A wireless communication method, comprising:
performing, with circuitry, spatial filtering respectively on received signals of a plurality of antennas to form corresponding spatially-filtered signals;
estimating, based on the corresponding spatially-filtered signal of each of the antennas, a frequency offset of the corresponding received signal;
estimating, based on parameters of the spatial filtering and the estimated frequency offset, a Doppler shift of the received signal caused by a relative movement between a receiving terminal and a transmitting terminal and a carrier frequency offset caused by frequency inconsistency of equipment at the receiving terminal and at the transmitting terminal; and
performing control to feedback information on the estimated Doppler shift to the transmitting terminal of the received signal, wherein at least the estimated Doppler shift is based on a linear combination of the Doppler shift and carrier frequency offset, and the linear combination includes a direction angle $\theta_R$ of a relative movement between the receiving terminal and the transmitting terminal of the received signal.

15. The method according to claim 14, wherein the carrier frequency offset is estimated based on a relation that the frequency offset is a linear combination of the Doppler shift and the carrier frequency offset.

16. The method according to claim 15, wherein the Doppler shift and the carrier frequency offset are estimated by using a weighted least square method, and wherein the weighting is performed based on signal-to-noise ratios of the respective spatially-filtered signals of the plurality of antennas.

17. The method according to claim 14, wherein estimates of the Doppler shift and the carrier frequency offset are calculated using an observation matrix and a weighting matrix, wherein the observation matrix is predetermined based on a direction angle $\phi_n$ for the spatial filtering and the direction angle $\theta_R$ of the relative movement between the receiving end and the transmitting end of the received signal.

18. The method according to claim 14, wherein estimates of the Doppler shift and the carrier frequency offset are calculated using an observation matrix and a weighting matrix, wherein the weighting matrix is determined based on the signal-to-noise ratio of the spatially filtered signal estimated frame-by-frame.

19. The method according to claim 14, wherein the Doppler shift and the carrier frequency offset are estimated frame-by-frame for the received signal.

20. The method according to claim 14, wherein the information includes a direction angle of spatial filtering corresponding to the signal with a highest signal-to-noise ratio among the spatially-filtered signals.

* * * * *